United States Patent [19]

Engström et al.

[11] 4,376,890
[45] Mar. 15, 1983

[54] FIBER-OPTIC TEMPERATURE-MEASURING APPARATUS

[75] Inventors: Olof Engström; Christer Ovrén, both of Västerås, Sweden

[73] Assignee: Asea Aktiebolag, Västerås, Sweden

[21] Appl. No.: 194,397

[22] Filed: Oct. 6, 1980

[30] Foreign Application Priority Data

Oct. 10, 1979 [SE] Sweden .................... 7908382

[51] Int. Cl.³ .............................................. G02B 5/14
[52] U.S. Cl. .............................. 250/227; 250/231 R; 250/461.1
[58] Field of Search ............... 250/227, 461 R, 231 R

[56] References Cited

U.S. PATENT DOCUMENTS 4,075,493  2/1978  Wickersheim .............. 250/461 R
4,275,296  6/1981  Adolfsson .................. 250/227

FOREIGN PATENT DOCUMENTS 1480583 of 0000 United Kingdom .

Primary Examiner—David C. Nelms
Assistant Examiner—Darwin R. Hostetter
Attorney, Agent, or Firm—Watson, Cole, Grindle & Watson

[57] ABSTRACT

A fiber-optic temperature-measuring apparatus which monitors the photo-luminescence of a body of solid material subjected to the temperature to be measured. Exciting radiation is conducted by means of at least one optical fiber towards a material with temperature-dependent luminescence which is in optical contact with the fiber, whereby luminescence occurs. The radiation emitted as a consequence of the luminescence is transmitted via at least one optical fiber from the body to a place of measurement, where a measure of the temperature may be obtained. The luminescent body may consist of a semiconductor material.

28 Claims, 6 Drawing Figures

FIBER-OPTIC TEMPERATURE-MEASURING APPARATUS

BACKGROUND OF THE INVENTION

1. Field of the Invention

This invention relates to a fiber-optic temperature-measuring apparatus which is based on the photo-luminescence of a solid material, which is subjected to the temperature to be measured.

For many applications of temperature measurement, it is of great interest to be able to use a non-electrical method, which utilizes light transmission in optical fibers. Such applications are especially advantageous in explosive environments or in areas with strong electric or magnetic fields.

2. Description of the Prior Art

A disadvantage associated with certain known measuring apparatus of this kind is that they cannot be positioned at any place without special measures. A further drawback is that it is not possible to distinguish changes in transmitted radiation which are due to the temperature, from other radiation changes that may occur for other reasons. In practice, known fiber-optic temperature-measuring apparatus has to be calibrated with a known temperature after the apparatus has been positioned at the place of measurement, and this involves a complication.

One solution to the above-mentioned problems, and other associated problems, is disclosed in published European patent application No. 0006530 in which the temperature-dependent, spectral absorption capacity is measured in a material which is exposed to the temperature to be measured, optical fibers then being used for passing light to said material and for passing out part of this light after absorption in the material. The measuring apparatus is provided with means for determining the absorption capacity at at least two wavelength ranges of the light falling into the material.

Another measuring apparatus, which may be used for fiber-optic temperature measurement, is the object of Brogaardh et al's U.S. patent application Ser. No. 152,746 (related to the instant application by a common assignee). In this application, an optical fiber is arranged in optical contact with a thyristor and a light signal emitted from the thyristor is used, among other things, as a measure of the temperature of the thyristor.

It is also known to use in temperature measurements, a material which emits radiation of wavelength that is dependent on the temperature of the material.

The present invention is an improvement of this known technique which is a solution to the above-mentioned problems. Furthermore, there is no requirement for an electric current to pass through the solid material. It is a parallel solution to the above-mentioned measuring apparatus, which used the spectral absorption capacity of a material.

SUMMARY OF THE INVENTION

According to one aspect of the invention, a fiber-optic temperature-measuring apparatus comprises a body of a temperature-dependent photo-luminescent solid material which body is subjected to the temperature to be measured, a source of exciting radiation for the body which will cause the latter to luminesce, a fiber-optic mechanism for feeding the exciting radiation to the body, an electro-optical measuring mechanism for generating an electrical output related to an optical input, and a fiber-optic mechanism for feeding luminescent radiation from the body to the mechanism measuring means.

Thus, in one embodiment, excitation light is adapted to be conducted, by means of at least one optical fiber, towards a semiconductor material with temperature-dependent luminescence which is in optical contact with the fibre, whereby luminescence occurs in the irradiated material, and the light thus emitted is adapted to be conducted, via at least one optical fiber, possibly wholly or partially the same as the former, to an electronic measuring means. The light emitted by the luminescence, and possibly reflected excitation light are adapted to be conducted via separate fibers or via a common fiber and possibly also via a fiber branch to two photo-detectors having mutually different spectral response curves, or that the light emitted by the luminescence is adapted to be supplied via a fiber, possibly also via a fiber branch, to at least two photo-detectors having mutually different spectral response curves.

The invention thus concerns a new principle of temperature measurement, in which fiber optics are utilized. It is a reliable, economical and sturdy measuring apparatus which may be used to advantage in difficult environments and/or in environments which are difficult to reach, for example in plants which are under voltage.

In a preferred embodiment, the body is composed of a semiconductor material with temperature-dependent luminescence. As advantageous examples of such semi-conducting materials may be mentioned GaP, suitably doped with Zn and O or Cd and O, or ZnSe, suitably doped with Cu or Mn.

DETAILED DESCRIPTION OF PREFERRED EMBODIMENT

According to a further aspect of the invention a fiber-optic temperature-measuring apparatus comprises first and second bodies of temperature-dependent photo-luminescent solid material the first of which bodies is subjected to the temperature to be measured, thermal control means for modifying the temperature of the second body, means for measuring the temperature of the second body, at least one source of exciting radiation for the said bodies which will cause each to luminesce, fiber-optic means for feeding exciting radiation to the two bodies and for feeding luminescent radiation from the bodies to electro-optical measuring means, means for determining from the electrical output of the measuring means when the luminescent radiation from the two bodies is the same and thus when the temperature of the first body equals the measured temperature of the second.

Wavelengths in the range 0.1 to 10 microns would normally be employed.

BRIEF DESCRIPTION OF DRAWINGS

The invention will now be exemplified in greater detail with reference to the accompanying drawings, in which.

The invention concerns a fiber-optic temperature-measuring apparatus in which the photo-luminescence of a semiconductor, or of any other body of solid material having photo-luminescent properties, is utilized. Two different effects may then be used alternatively, namely the temperature dependence of the luminescence effect as well as the temperature dependence of the spectral distribution of the luminescence. By simultaneous detection of the reflection of the exciting radiation, variations in intensity caused by losses in the fiber-optic system may be compensated for by dividing the luminescence signal by this reflected signal. The advantage of this method, as compared with previous fibre-optic methods, is that the temperature dependence of the measuring apparatus may be varied within wide limits by selection of a suitable luminescent material and by suitable doping of that material.

A few embodiments of the invention are shown in the accompanying Figures and are described in the following.

DESCRIPTION OF PREFERRED EMBODIMENTS

Figure 1A:
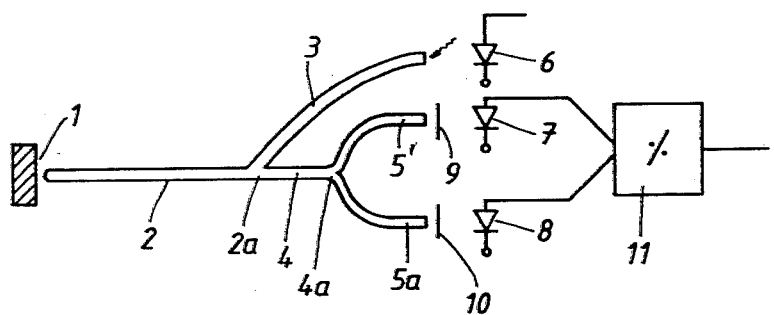
FIG. 1a shows a first embodiment of the invention utilizing both the light emitted through luminescence and the excitation light reflected from a surface of the temperature-sensing body.

In a first embodiment, which is shown in FIG. 1a, a solid material 1, for example, a semiconductor material, is optically coupled to a fiber 2 which branches off at 2a into fibers 3 and 4. Fiber 4 is in turn branched off at 4a into fibers 5 and 5a. A light-emitting diode 6 (LED) is optically coupled to the fiber 3 and is capable of exciting photo-luminescence in the material 1. A photo-diode 7 is optically coupled to the fiber 5 via an optical filter 9, selected to transmit only radiation from the LED 6 which is reflected by the material 1. Radiation detected by the photo-diode 7 has thus passed through fibers 3 and 2 and after reflection from the material 1 passes through fiber 4 and fiber 5. If the attenuation of the radiation in its passage through the fiber system in one direction is equal to B, the signal detected by the photo-diode 7 becomes approximately equal to the product of $B^2$ and $L_O$, where $L_O$ is the intensity of radiation emitted by the LED 6 which enters the fiber 3.

A second photo-diode 8 is optically coupled to fiber 5a, via a second filter 10 selected to transmit only the radiation that is emitted by the luminescence of the material 1.

If the efficiency of the luminescence process in the material 1 is $\eta$, the signal detected by the photo-diode 8 becomes approximately equal to $B \cdot \eta \cdot B L_O$. The signals from the two photo-diodes 7 and 8 are supplied to a quotient-forming circuit 11, the output signal of which therefore becomes approximately equal to $\eta$. Because the efficiency is temperature dependent ($\eta(T)$), the temperature of the material 1 may be obtained from the output signal of the circuit 11 and this temperature measurement is independent of transmission losses in the fiber optics or alterations of $L_O$ caused by temperature drift and/or ageing of the LED 6.

Figure 1B:
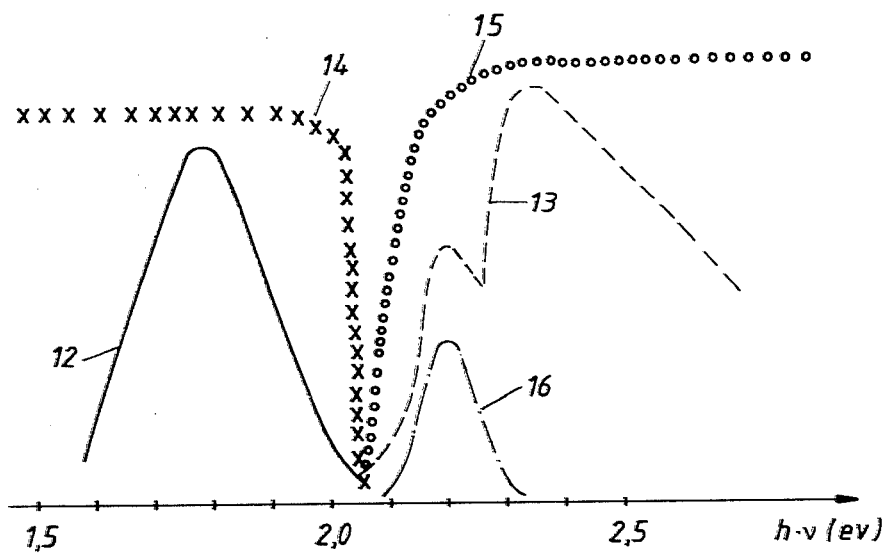
FIGS. 1b and 2b show the corresponding wavelength intensity curves relating to the embodiments, respectively of FIGS. 1a and 2a, FIG. 3 shows a third embodiment of apparatus which is based on a comparative principle.

FIG. 1b illustrates spectra for a system consisting of a green-radiant GaP LED 6, a GaP crystal doped with Zn and O for the material 1, and silicon diodes as the photo-diodes 7 and 8. In FIG. 1b, the unbroken curve 12 is the luminescence spectrum of the material 1 and the broken curve 13 is the excitation spectrum for the luminescent material 1. The curve 14 is the transmission curve for the filter 10 and the curve 15 is the transmission curve for the filter 9. The curve 16 represents the output spectrum of a green-radiant LED. In the abscissa, the unit $h\nu$ is used, where h is Planck's constant and $\nu$ is the frequency of the radiation, whereas the ordinate indicates the transmission for the respective filters 9 and 10, the intensity of the radiation emitted by luminescence, the intensity of the radiation emitted by the LED 6 and the spectral sensitivity of the luminescent material 1. The luminescence spectrum 12 is displaced along the abscissa and changes its shape in dependence on the temperature of the material 1, and in this way a measure of the temperature is obtained at the output side of the quotient-forming circuit.

Further possible choices for the material 1 may be GaP:Cd,O (i.e. a GaP crystal doped with cadmium and oxygen), or ZnSe:Cu (i.e. ZnSe doped with copper), or ZnSe:Mn (i.e. ZnSe doped with manganese).

The semiconductor material may consist of AlP, AlAs, GaP, InP, InAs, $In_{1-x}Al_xP$, $In_{1-x}Ga_xP$, $Ga_{1-x}Al_xP$, $In_{1-x}Al_xAs$, $In_{1-x}Ga_xAs$, $Ga_{1-x}Al_xAs$, $InAs_{1-y}P_y$, $GaAs_{1-y}P_y$, where x and y lie between 0 and 1, or ZnTe, ZnSe, ZnS, ZnO, CdSe, CdTe or CdS.

The system shown in FIG. 1a can be modified. Thus it is possible to send the excited radiation from the LED 6 to the material 1 in one fiber and the radiation emitted from the material 1 through luminescence and/or the reflected radiation in another separate fiber, provided with the necessary junctions.

Figure 2A:
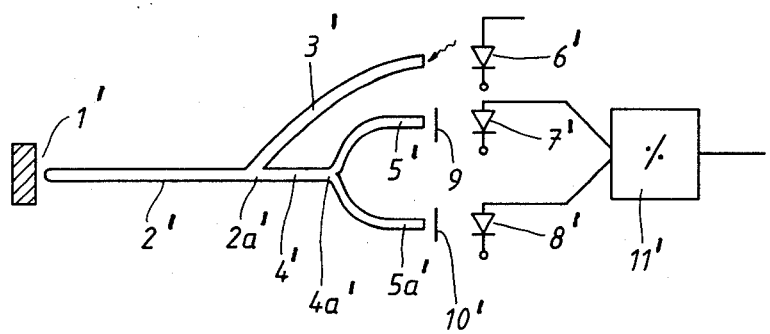
FIG. 2a shows a second embodiment in which the light within two wavelength intervals, emitted through the luminescence, is detected.

FIG. 2a shows another embodiment, in which radiation is emitted from an LED 6' via fibers 3' and 2' to a material 1', such as a body of semiconductor material, thus obtaining photo-luminescence. The radiation emitted by photo-luminescence is sent via a fiber 2', a branch 2a', a fiber 4' and a branch 4a' to two fibers 5' and 5a', respectively. The transmission curve for a filter 9' is in this case different from that of the filter 9 in FIG. 1a. In this embodiment, the quotient between the luminescence signal from two different wavelength intervals is detected with the aid of two filters 9' and 10'. (See FIG. 2b.) When the temperature of the sensor material 1' is varied, the shape and position of the luminescence spectrum are changed, the detected quotient then providing a measure of the temperature of the sensor material 1'. Also in this case, the output signals from two photo-diodes 7' and 8' are supplied to a quotient-forming circuit 11', the output signal of which is thus a measure of the temperature. The measuring signal is again independent of fiber losses and variations in the intensity, etc. of the radiation emitted from the LED 6'.

Figure 2B:
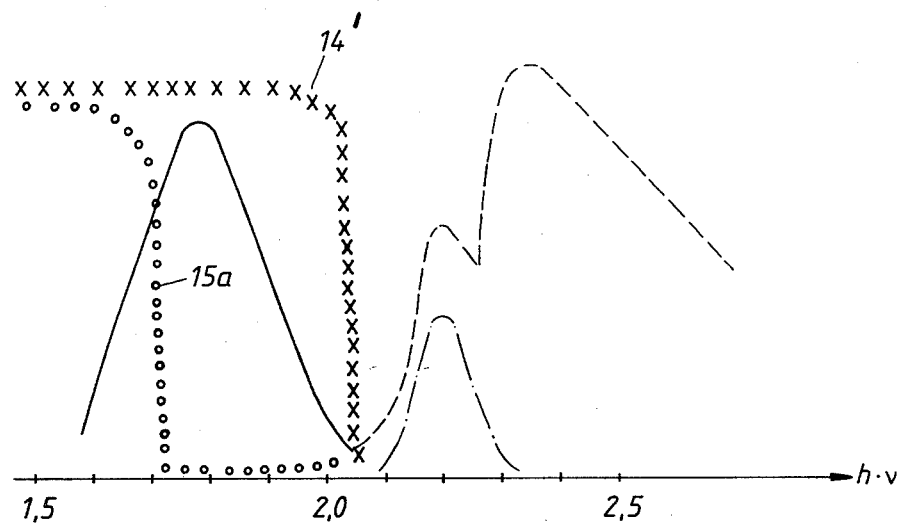

FIG. 2b is a second spectra curve which corresponds to FIG. 1b with the exception that the transmission curve for the filter 9', indicated at 15a in FIG. 2b, is different compared with the curve 15 in FIG. 1b. The transmission curve of the filter 9' is thus displaced to the left into a different wavelength range, whereas the transmission curve for the filter 10', i.e. curve 14' in FIG. 2b is unchanged in shape or position compared to curve 14 in FIG. 1b, as are the other three curves shown in FIG. 2b.

Figure 3:
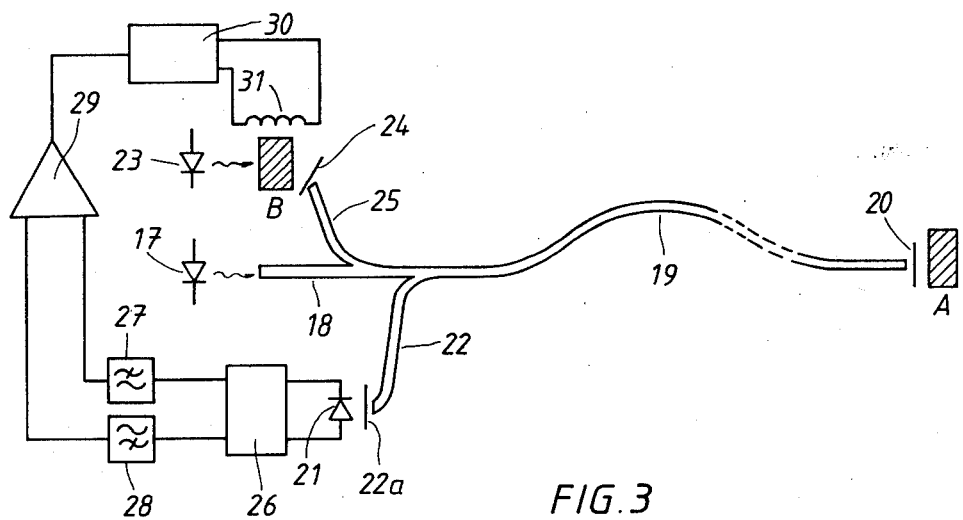

An alternative system for temperature measurement according to the invention is shown in FIG. 3. An LED 17 emits radiation with an intensity $L_{17}$, amplitude-modulated at a frequency of $f_{17}$, into a fiber 18 and thus to a luminescent material A via a fiber 19. Between the end of the fiber 19 and the luminescent material A there is interposed a semi-transparent mirror 20. The radiation emitted as a consequence of the luminescence of the material A is passed to a photo-detector 21 through the fiber 19 and a fiber 22 and through a filter 22a which does not transmit radiation of wavelengths corresponding to the excitation radiation from the LED 17.

The intensity detected by the photo-detector 21 thus becomes $K_1 \cdot L_{17} \cdot B^2 \cdot \eta(T_A)$. This signal also has a frequency of $f_{17}$.

An LED 23, identical with the LED 17, emits radiation with an intensity of $L_{23}$, and which is amplitude-modulated at a frequency of $f_{23}$, towards a luminescent material B, which has properties identical with those of material A. The radiation emitted as a consequence of luminescence in the material B is conducted through a filter 24, which has a transmission curve identical with that of the filter 22a, and then through a fiber 25 and into the fiber 19, to be reflected partially by the mirror 20 back to the photo-detector 21 through the fiber 19 and the fiber 22. The intensity thus detected by the photo-detector 21 becomes $K_2 \cdot L_{23} \cdot B^2 \cdot \eta(T_B)$. The intensity $L_{17}$ and/or the intensity $L_{23}$ is/are adjusted such that $K_1 \cdot L_{17} = K_2 \cdot L_{23}$. The signal from the photo-detector 21 is amplified in an amplifier 26. Through the influence of electrical filters 27 and 28, the two components of the output signal from the photo-detector 21 which have frequencies of $f_{17}$ and $f_{23}$, respectively, are separated and separately supplied to different inputs of a control circuit 29, which controls a power circuit 30 of a heater/cooler 31. The output of the circuit 30 is controlled to ensure that the two input signals to the control system 29 are maintained equal. This occurs when $\eta(T_B) = \eta(T_A)$, i.e. when $T_B = T_A$. By measuring $T_B$, for example by using a thermocouple, $T_A$ is thus obtained directly. The temperature of the luminescent material A, i.e. $T_A$, can thus be determined by this method without knowledge of the value of the factor B, which represents the attenuation in those parts of the system which are traversed by the two optical signals, which thus means that, for example, a reduction in the optical signal, caused by losses in the fiber 19, will not influence the accuracy of the temperature measurement.

Figure 4:
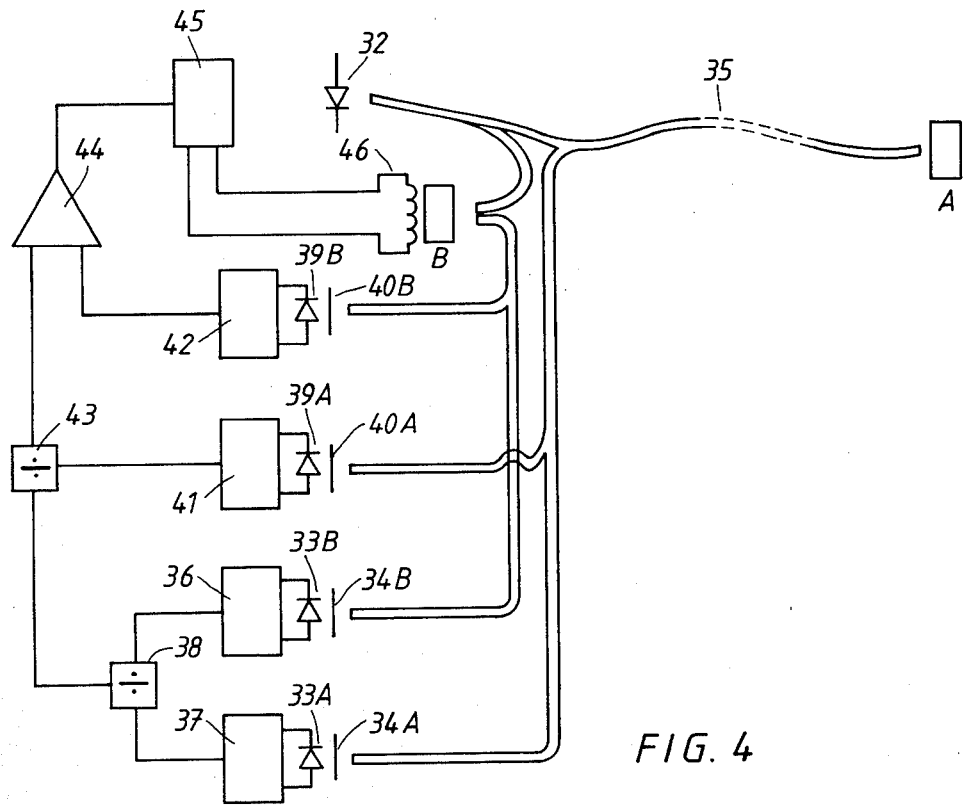
FIG. 4 shows a fourth embodiment of the invention.

A further embodiment is shown in FIG. 4. Radiation from a photo-diode 32 is led through a fiber system to a luminescent material A, which is exposed to the temperature to be measured, as well as to a material B which is identical with A, the temperature of which is to be controlled. A photo-detector 33A, which is provided with an optical filter 34A transmitting the excitation radiation, provides an output signal proportional to $L_O \cdot B^2$, where B represents the attenuation of the optical signal during its passage in one direction through the fiber system 35. A system comprising a photo-detector 33B and a filter 34B is identical with the system comprising the photo-detector 33A and the filter 34A. The system 33B–34B is supplied with the excitation radiation that is reflected from the surface of the material B and provides an output signal which is proportional to $L_O$. The system 33A–34A is supplied with the excitation radiation that is reflected from the surface of the material A and provides an output signal proportional to $B^2 \cdot L_O$. After amplification in amplifiers 36 and 37, the quotient between these two signals is formed in a quotient-forming circuit 38, a signal proportional to $B^2$ thus being obtained. A system comprising a photo-detector 39A and a filter 40A and a system comprising a photo-detector 39B and a filter 40B have identical properties. Filters 40A, 40B transmit the radiation emitted due to the luminescence in the materials A and B. The output signals from amplifiers 41 and 42 are thus proportional to $L_O \cdot B^2 \cdot \eta(T_A)$ and $L_O \cdot \eta(T_B)$, respectively. The output signal from a quotient-forming circuit 43, which receives signals from the amplifier 41 and the quotient-forming circuit 38, is thus proportional to $L_O \cdot \eta(T_A)$. This signal and the output signal from the amplifier 42 are supplied to separate inputs of a control circuit 44. The operation of this circuit and of a power circuit 45 and a heater/cooler 46 is analogous to what has been described in connection with the system according to FIG. 3. In the FIG. 4 embodiment, as in the FIG. 3 embodiment, temperature of the material B is measured by any suitable method to give a measure of the temperature of the material A.

The systems described above with reference to the drawings may be varied in many ways within the scope of the following claims.

What is claimed is:

1. A fiber-optic temperature-measuring apparatus comprising:
   a body of a temperature-dependent photo-luminescent solid semi-conductive material wherein said body is subjected to a temperature to be measured;
   a source of exciting radiation directed to said body so as to cause said body to luminesce and produce luminescent radiation;
   fiber-optic means for directing said exciting radiation to said body;
   measuring means operatively associated with said body;
   fiber-optic means for directing said luminescent radiation from said body to said measuring means; and
   two photodetectors having mutually dissimilar spectral response curves operatively associated with said measuring means and provided for receiving said luminescent radiation via said fiber optic means for directing said luminescent radiation from said body to said measuring means.

2. Measuring apparatus as claimed in claim 1, in which said two photodetectors monitor the radiation from the body over said dissimilar spectral response curves, one of which corresponds to said exciting radiation reflected from the body.

3. Measuring apparatus according to claim 1 or claim 2, characterised in that the body is of a semiconductor material selected from the group consisting of AlP, AlAs, GaP, GaAs, InP, InAs, $In_{1-x}Al_xP$, $In_{1-x}Ga_xP$, $Ga_{1-x}Al_xP$, $In_{1-x}Al_xAs$, $In_{1-x}Ga_xAs$, $Ga_{1-x}Al_xAs$, $InAs_{1-y}P_y$, $GaAs_{1-y}P_y$, and y being between 0 and 1, ZnTe, ZnSe, ZnS, ZnO, CdTe, CdSe and CdS.

4. Measuring apparatus according to claim 3, characterised in that the semiconductor material is GaP doped with one of Zn and Cd and with O.

5. Measuring apparatus according to claim 3, characterised in that the semiconductor material is ZnSe doped with one of Cu and Mn.

6. Apparatus as claimed in claim 1 or claim 2, in which a part of the fiber-optic means for feeding exciting radiation to the body is the same as a part of the fiber-optic means used for feeding luminescent radiation from the body to the measuring means.

7. Measuring apparatus according to claim 6, in which each of said two photodetectors is provided with an optical filter, one filter transmitting the radiation emitted by luminescence in the body and the other filter transmitting exciting radiation reflected by said body.

8. Measuring apparatus according to claim 7, in which a function generator is arranged to receive the output signals from the two photo-detectors, the output signal from the function generator providing a measure of the temperature of the body of luminescent material.

9. Measuring apparatus according to claim 8, in which the function generator is a quotient-forming circuit.

10. A fiber-optic temperature-measuring apparatus comprising first and second bodies of temperature-dependent photo-luminescent solid material, the first of which bodies is subjected to the temperature to be measured, thermal control means for modifying the temperature of the second body, means for measuring the temperature of the second body, at least one source of exciting radiation for the said bodies which will cause each to luminesce, fiber-optic means for feeding exciting radiation to the two bodies and for feeding luminescent radiation from the bodies to electro-optical measuring means, means for determining from the electrical output of the measuring means when the luminescent radiation from the two bodies is the same and thus when the temperature of the first body equals the measured temperature of the second.

11. Measuring apparatus according to claim 1 or claim 2, in which the exciting radiation is derived from a light-emitting diode.

12. Measuring apparatus according to claim 6, in which a partially transparent mirror is arranged between the end of the fiber-optic means closest to the body and the body of luminescent material.

13. Measuring apparatus according to claim 1 or claim 2, in which radiation within two different wavelength ranges is employed, only one of said wavelength intervals including the wavelength range within which the luminescent material may be excited.

14. Measuring apparatus according to claim 13, in which an optical element is arranged between the end of the fiber-optic means closest to the body and the body of luminescent material, said optical element transmitting radiation within the wavelength interval of the exciting radiation and within the wavelength interval of the luminescent radiation but reflecting radiation within any other wavelength interval.

15. Measuring apparatus according to claim 14, in which the radiation emitted by the luminescence and the radiation reflected by said optical element are adapted to be conducted via fiber-optic means, to said two photo-detectors.

16. Measuring apparatus according to claim 15, in which the two photo-detector means each include an optical filter, one filter transmitting the radiation emitted by the luminescence and the other filter transmitting the radiation reflected by the said optical element.

17. Measuring apparatus according to claim 16, in which the output signals from the two photo-detectors are adapted to be supplied to a function generator, the output signal of which is a measure of the temperature of the luminescent material.

18. Measuring apparatus according to claim 1 or claim 2, in which a second body of temperature-dependent photo-luminescent solid material which is identical with the material used in the first-mentioned body as regards photo-luminescence, is provided, together with means whereby the temperature of said second body may be regulated.

19. Measuring apparatus as claimed in claim 10, in which the first and second bodies are made to luminesce at two different repetition rates, the two luminescent radiations being fed to a single photo-detector whose electrical output is processed to divide it into a component corresponding to the luminescence of the first body and a component corresponding to the luminescence of the second body.

20. Measuring apparatus according to claim 19, in which a partially reflecting member is disposed between the first body and the fiber-optic means to reflect the luminescent radiation from the second body.

21. Measuring apparatus according to claim 19 or 20, in which the divided output signals of the photo-detector are supplied to a control circuit, the output signal of which feeds a power amplifier for controlling the temperature of the second body.

22. Measuring apparatus according to claim 10, in which exciting radiation from a common source is fed to the first and second bodies, and the luminescent radiations from the two bodies are fed to different photo-detectors.

23. Measuring apparatus according to claim 22, in which exciting radiation reflected from the first body is supplied to one photo-detector of a detector system and exciting radiation reflected from the second body is supplied to a second photo-detector of the same detector system.

24. Measuring apparatus according to claim 23, in which the output of each photo-detector is supplied to a function generator.

25. Measuring apparatus according to claim 24, in which the output signal from the function generator is adapted to be supplied to a second function generator together with the output signal from a third detector positioned to receive luminescent radiation emitted from the first body.

26. Measuring apparatus according to claim 25, in which the output signal from the second function generator is adapted to be supplied to a control circuit with an output signal from a fourth detector positioned to receive luminescent radiation emitted from the second body.

27. Measuring apparatus according to claim 26, in which the output signal from the control circuit is supplied to a power amplifier for temperature control of the second body.

28. Measuring apparatus as claimed in claim 24 or 25, in which the function generator is a quotient-forming circuit.

* * * * *